July 5, 1927.   T. C. LENNOX   1,635,000
CONTINUOUS CURRENT GENERATOR
Filed Aug. 20, 1925   3 Sheets-Sheet 1
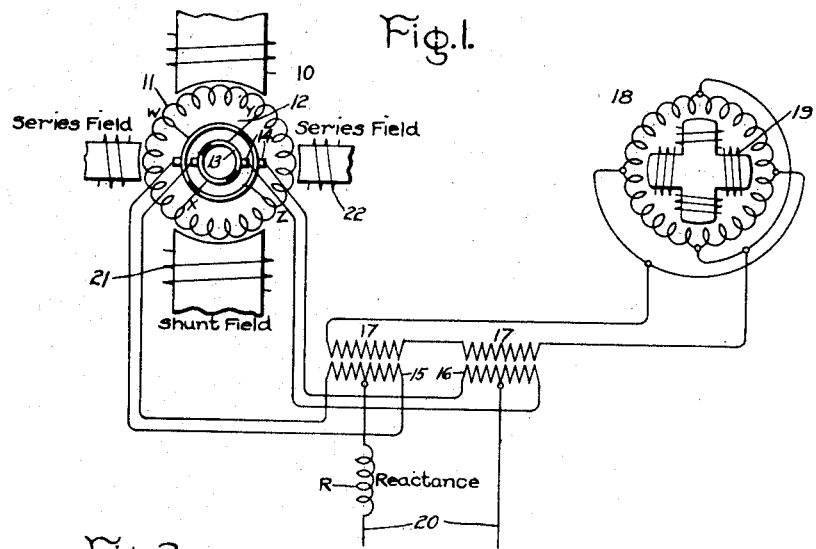
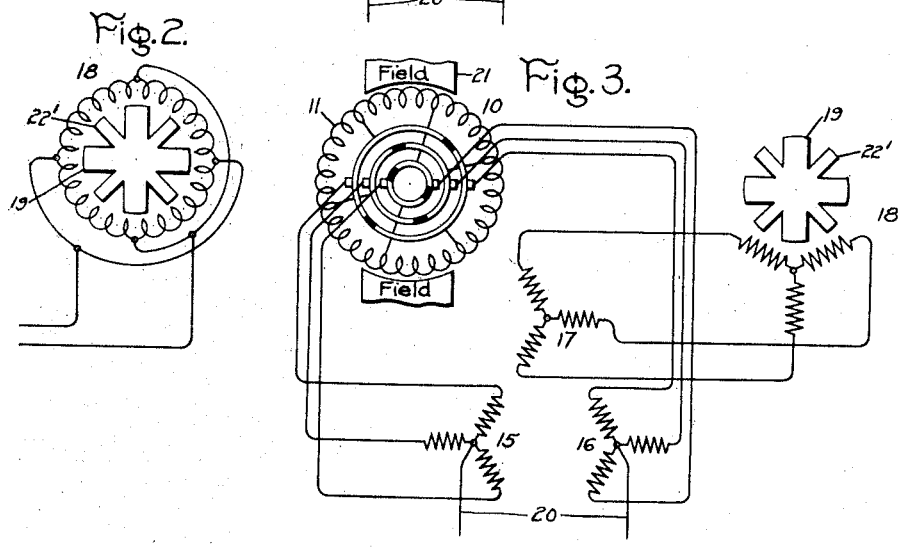
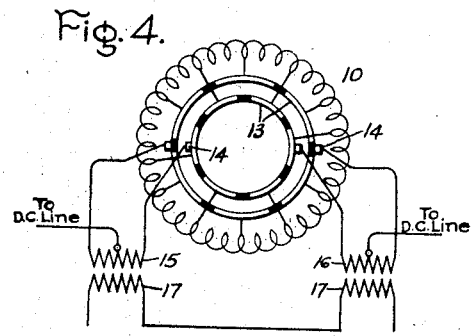
Inventor:
Thomas C. Lennox,
by *Alexander S. [illegible]*
His Attorney.

Inventor:
Thomas C. Lennox,
by
His Attorney.

July 5, 1927.

T. C. LENNOX 1,635,000

CONTINUOUS CURRENT GENERATOR

Filed Aug. 20, 1925    3 Sheets-Sheet 3

Inventor:
Thomas C. Lennox,
by His Attorney.

Patented July 5, 1927.

1,635,000

UNITED STATES PATENT OFFICE.

THOMAS C. LENNOX, OF PITTSFIELD, MASSACHUSETTS, ASSIGNOR TO GENERAL ELECTRIC COMPANY, A CORPORATION OF NEW YORK.

CONTINUOUS-CURRENT GENERATOR.

Application filed August 20, 1925. Serial No. 51,491.

My invention relates to apparatus for generating high voltage direct currents.

The usual form of direct current generator is limited as regards the voltage which it can produce by reason of the fact that the coils are successively short circuited by the brushes during commutation. This necessitates the use of high resistance conductors in the current collection circuit and limits the voltage of the individual coils or phases to small values, and further requires the generation of alternating voltages which deviate from a sign wave in order that zero or little voltage exists during the period at which the coil may be short circuited.

According to my invention I rectify the alternating currents generated in the coils of a usual type of substantially sign wave armature by means which permit of completely opening the circuit between the alternating current generator coil and the direct current collecting brush during the period of reversal, and at the same time I provide means of drawing current from a plurality of phases without permitting a short-circuit from phase to phase. This is accomplished by opposing the phase voltages through a circuit containing an auxiliary generator which gives alternating voltages sufficient to oppose the difference in voltage between the phases being rectified and of the proper phase relation to prevent the flow of short-circuit current between such phases. By this means I provide apparatus suitable for delivering direct current of substantially uniform voltage and at voltages above that practicable to obtain with existing apparatus.

Figure 5:
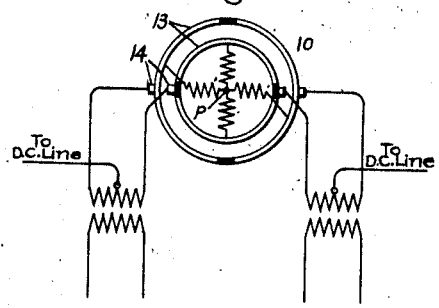
Figure 6:
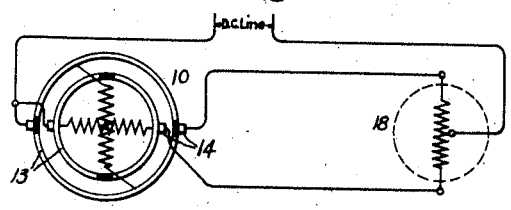
Figure 9:
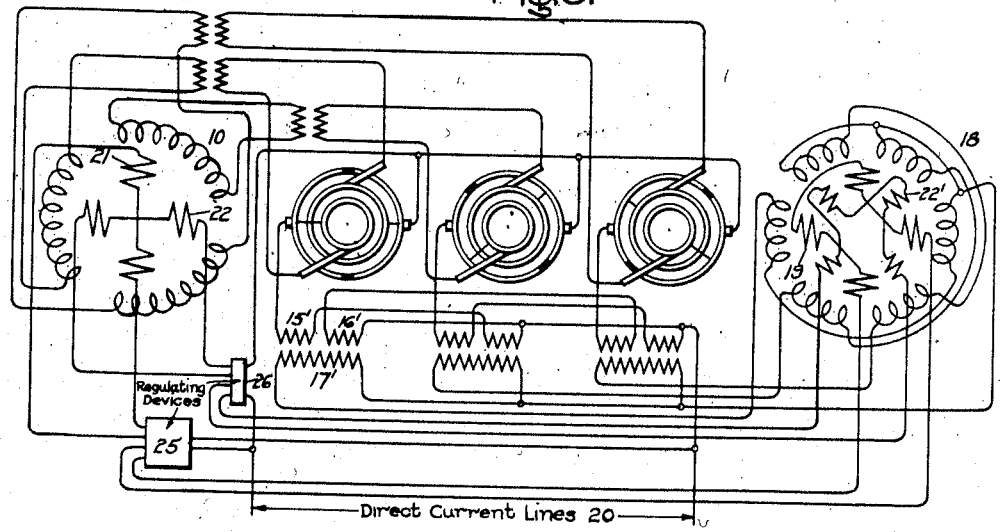
Figure 7:
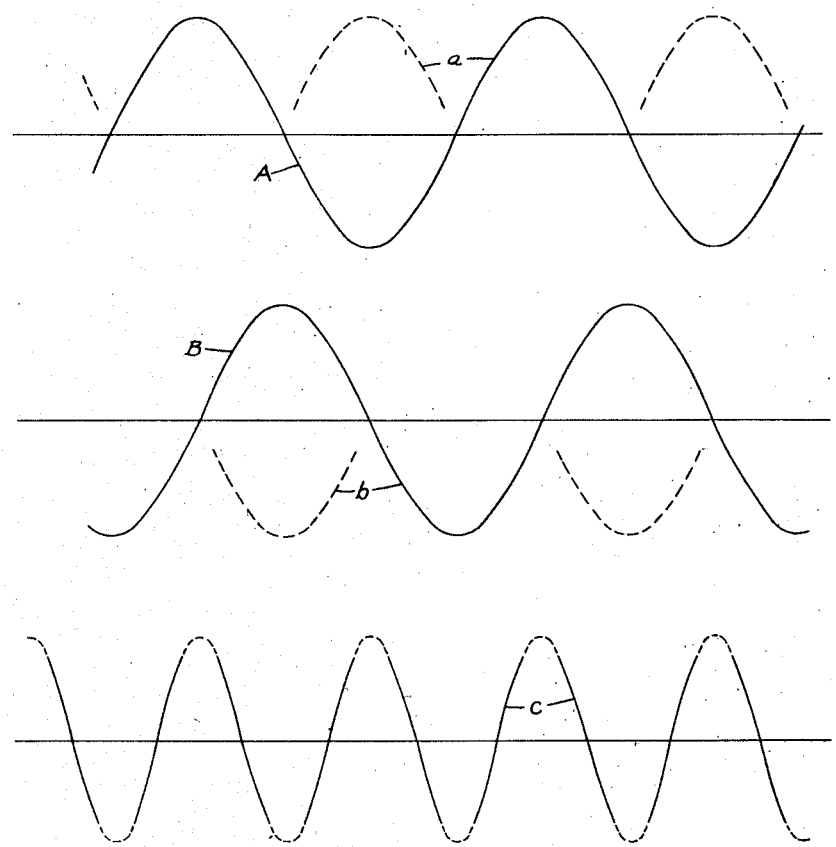
Figure 8:
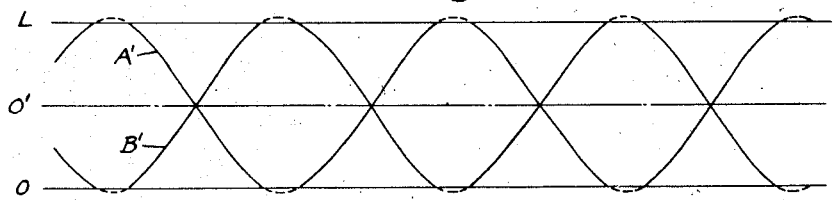

The features of my invention which are believed to be novel and patentable will be pointed out in the claim appended hereto. For a better understanding of the invention reference is made in the following description to the accompanying drawing in which Fig. 1 represents the essentials of the invention involving main and auxiliary generators; Fig. 2 shows a modification where the series field of the apparatus is placed in the auxiliary generator; Fig. 3 shows a modification which employs a 6-phase main generator; Fig. 4 shows a 12-phase main generator; Fig. 5 shows the main generator connected diametrically instead of in ring; Fig. 6 shows a method of eliminating one brush circuit; Figs. 7 and 8 are curves to be referred to in explaining the invention; and Fig. 9 is a modification of the invention employing shunt and series fields on both main and auxiliary generators.

Fig. 1 shows the essentials of the apparatus. The main generator 10 represents an alternating current synchronous generator with its armature windings 11 connected in a ring or polygon circuit with leads 12 connected to deliver four phase current. Opposite pairs of these leads are connected to rectifying devices comprising segments 13 and brushes 14 having circuits such that they are connected alternately to the terminals of a transformer having three windings 15, 16 and 17. It will be observed that each of the two rectifying devices is arranged so that each phase rectifying circuit is opened completely when its terminals are reversed so that no short-circuit occurs between adjacent commutator segments, and that at other times each of the phases of the winding from which current is being delivered is connected to the terminals of a transformer winding 15 or 16. It will be observed that the positive brushes of each rectifier are connected across one transformer winding 15 and the negative brushes of each rectifier are connected across another transformer winding 16. The direct current lines 20 are connected to the middle points of these transformer windings.

The third winding 17 of the transformer is shown in two groups connected to a second synchronous generator 18 arranged to deliver single phase current of double the frequency of the main generator. This generator has a shunt field 19 for connection to the direct current lines 20. It is mounted on the same shaft as the main generator or otherwise kept in exact phase relation with it and the apparatus is arranged to be driven by a motor or prime mover not shown.

The main generator has two sets of field coils, one, 21, wound for shunt connection across the direct current line 20 and one 22 for series connection in the line 20. In order to avoid complicating the drawings the connections between the field coils and line 20 have been omitted except in Fig. 9. The phase rotation between main and auxiliary generators and their relative phase positions at any given instant must of course be correctly selected to give the desired results explained hereinafter. The main or shunt field 21 will cause the generation of an alternating voltage in winding 11 which will reach its maximum in each phase at the time when the rectifier connected to that phase is in contact and half way between its two open circuit positions. The series field 21 will cause the generation of an alternating voltage in quadrature with that due to the shunt field. These field coils need not necessarily be placed on salient poles as shown in the drawing but may, if desired, be distributed windings.

The operation of the device is as follows: The open circuit rectifiers rectify the diametral two phase voltages and apply the resulting pulsating voltages to the terminals of the transformer windings 15 and 16. Thus, in Fig. 7 if A and B represent the diametral voltages of the generator, voltage pulsations such as indicated by dotted lines $a$ and $b$ will be applied to the transformer. One series of pulsations such as $a$ will appear between the right hand lead of 16 and the left hand lead of 15 and the other $b$ will appear between the right hand lead of 15 and the left hand lead of 16. As these two series of pulsations are not in the same phase position, there will exist unbalanced voltages in the loop or circuit through 13, 14, 15 and 16, and the generator windings at times when all rectifier brushes are in contact, which voltage will tend to set up short circuit currents through the loop so formed. This voltage which is equal to the resultant of A and B during the time when both commutators are active will be applied half to 15 and half to 16. This total voltage is represented by the solid lines $c$ in Fig. 7. The voltage of the auxiliary generator is represented also by $c$ in Fig. 7, except that it is unbroken as indicated by the dotted lines. It may now be seen how this auxiliary generator voltage, although almost exactly of sine wave form, opposes the short circuit voltages between commutator brushes and prevents the circulation of short circuit currents. Moreover, due to the uninterrupted nature of the voltage of the auxiliary generator, the brushes will come into contact without substantial difference in potential between them and the rectifier segment they approach.

The direct current lines 20 being connected to the middle points of the transformer windings 15 and 16 will have between them the average rectifier voltage of the two phases which will be substantially uniform continuous voltage. If desired a reactor R may be inserted in the direct current line to damp out ripples.

If a load current is drawn from the device it must flow alternately from the two rectifying devices and will consequently exist in the brush circuits as pulsating currents which vary from zero at open circuit to full load current when the other phase is open. This is indicated in Fig. 8. The upper line L represents the load current which has a constant value above the zero line marked O. The wavy line A' represents the current in one brush varying from zero to full value. The current in the other brush of like polarity will be of the same form but will reach its maximum when the first is zero as represented by curve B'.

It will be observed that these currents may be considered as consisting of alternating currents imposed on a direct current of half line current value represented by the line O', and that these alternating currents flow through the circuits made by the transformer windings, the brushes, and the generator windings with which the brushes are in contact. If excessive induction in the transformer core is to be avoided, these alternating currents must be opposed by an equal and opposite current. This latter current is supplied by the auxiliary generator 18.

We thus have an alternating current of double frequency flowing through a circuit consisting of the main generator winding 11, rectifiers, transformer windings 15, 16 and 17, and auxiliary generator 18. This current will not flow unless an alternating voltage is provided to overcome the reactance of the circuit. This voltage is provided by the series field 22 of the main generator. If this field is properly adjusted in relation to line current, it will increase the generated voltage in the main generator and advance its phase position sufficiently to disturb the balance in voltage between main and auxiliary generators and set up the required alternating current in the circuits such that the current in each rectifying device will be zero in value as its contacts open.

Variations of the scheme are shown in Figs. 2 to 6.

In Fig. 2 the series field 22' is represented as placed in the auxiliary generator rather than in the main generator.

In Fig. 3, the number of phases in the main generator is increased to six and the number of rectifiers to three. The auxiliary generator and transformer are three-phase double frequency. The series field 22' is represented in the auxiliary generator 18 but may, if desired, be placed in the main generator.

In Fig. 4 the number of phases of the main generator is increased to twelve with two rectifying devices. An auxiliary generator (not shown) of six times the frequency of the main generator will be necessary here.

In Fig. 5 the main generator is shown arranged for two phases with diametric connection to the rectifying devices in place of ring connection. In this case a three-wire direct current system may be had by connecting the middle wire to the neutral point P of the armature winding.

In Fig. 6 is shown a method of eliminating one brush circuit due to the diametric connection used in Fig. 5. In the case of Fig. 6 the middle points of the armature windings must not be interconnected. In this figure the transformer has been omitted and the direct current passed through the auxiliary generator windings. This latter feature can be used with any of the above schemes, if the necessary number of windings are provided in the auxiliary generator and a proper magnetic balance is maintained among them.

Fig. 9 shows a modification in which series fields are provided in both the main and auxiliary generators, and in which the field of the main generator is made the rotor element of the machine. In this figure 10 and 18 respectively represent the main and auxiliary generators. The phases of the main generator are not interconnected in the generator itself but the windings 15' and 16' of the three phase transformer are interconnected as shown. The three-phase transformers may be connected zigzag as shown to balance undirectional fluxes. If desired transformers may be provided between the main generator and the rectifiers in case the voltage is very high. The shunt field 19 of the auxiliary generator and the shunt field 21 of the main generator are connected across the direct current line 20 through any suitable type of regulating device represented at 25 so that the two fields will be adjusted proportionately. Likewise the series fields 22' of the auxiliary generator and the series fields 22 of the main generator are connected in series relation with the direct current line 20 through a regulating device 26 such that the regulation will be proportional. The auxiliary generator has twice the number of poles as the main generator to provide the double frequency. The provision of series fields in both the main and auxiliary generators will give a somewhat better voltage and current balance in the system than where the series excitation is all provided on one machine. The same scheme may be applied to all the arrangements.

A number of other combinations of numbers of phases and rectifiers is possible but are not shown as the principles involved are the same. One refinement of design consists of adjusting the wave forms of the two generators to such characteristics as will give an exact balance between them and thus minimize the circulation of alternating currents of harmonic frequencies in the circuits or the imposition of harmonic voltages on the direct current lines.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:—

Apparatus for producing direct currents comprising a polyphase alternating current generator, mechanical rectifiers connected between the different phases of said generator and a direct current line, said rectifiers being arranged to completely open the circuit between their direct and alternating contacts at the point of reversal of the wave being rectified, an auxiliary alternating current generator driven in synchronism with said polyphase generator and rectifiers arranged and connected to oppose the voltage between rectifiers, said generator having shunt and series fields in quadrature supplied from the direct current line.

In witness whereof, I have hereunto set my hand this 11th day of August, 1925.

THOMAS C. LENNOX.